(12) United States Patent
Vidyasagar et al.

(10) Patent No.: US 9,856,917 B1
(45) Date of Patent: Jan. 2, 2018

(54) STRUT BEARING HAVING A SEALED HOUSING

(71) Applicant: Schaeffler Technologies AG & Co. KG, Herzogenaurach (DE)

(72) Inventors: Kunal Vidyasagar, Stratford (CA); Emily Bygrave, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/345,559

(22) Filed: Nov. 8, 2016

(51) Int. Cl.
*F16C 33/78* (2006.01)
*B60G 15/06* (2006.01)
*F16C 19/16* (2006.01)

(52) U.S. Cl.
CPC ........ *F16C 33/7886* (2013.01); *B60G 15/068* (2013.01); *F16C 19/163* (2013.01); *F16C 33/7806* (2013.01); *B60G 2202/312* (2013.01); *B60G 2204/1242* (2013.01); *B60G 2204/418* (2013.01); *F16C 2226/74* (2013.01); *F16C 2326/05* (2013.01)

(58) Field of Classification Search
CPC ............ B60G 15/068; B60G 2204/418; F16C 33/7886; F16C 33/7806; F16C 2226/74; F16C 2326/05
See application file for complete search history.

(56) References Cited

U.S. PATENT DOCUMENTS

| 4,948,272 A * | 8/1990 | Stowe ................. B60G 15/068 384/607 |
| 8,506,171 B2 | 8/2013 | Stautner et al. |
| 9,581,213 B2 * | 2/2017 | Lee ......................... F16F 1/127 |
| 2013/0277161 A1 | 10/2013 | Bussit et al. |
| 2014/0010491 A1 | 1/2014 | Lutz et al. |
| 2016/0146253 A1 * | 5/2016 | Weiss, II .................... F16F 9/54 188/321.11 |
| 2016/0243915 A1 * | 8/2016 | Bedeau ................ B60G 15/068 |
| 2016/0281784 A1 | 9/2016 | Wollner et al. |

* cited by examiner

*Primary Examiner* — Thomas R. Hannon
(74) *Attorney, Agent, or Firm* — Volpe and Koenig, P.C.

(57) ABSTRACT

A strut bearing has an upper carrier having a first outer rim and a first inner rim, the first inner rim having a first circumferential connector, and a lower carrier having a second outer rim and a second inner rim, the second inner rim having a second circumferential connector. The first inner rim is held to the second inner rim through an overlapping connection of the first circumferential connector to the second circumferential connector. The strut bearing also has a bearing arranged between the upper carrier and the lower carrier, and a first sealing ring positioned between and in contact with the first circumferential connector and the second circumferential connector. The sealing ring is formed from a material that is softer and more elastic than a material from which the first circumferential connector and the second circumferential connector are formed.

11 Claims, 2 Drawing Sheets

STRUT BEARING HAVING A SEALED HOUSING

FIELD OF INVENTION

The present invention relates to a strut bearing, and, more particularly, to a strut bearing having a sealed housing.

BACKGROUND

Vehicle suspension systems include strut bearings that absorb radial and axial forces to allow smooth operation of a shock-absorbing spring. The strut bearings are typically seated on top of the spring and connect to a vehicle mount to allow the springs to support the weight of the vehicle. Some strut bearings include a two-piece housing that forms an enclosure for the bearing components. For example, U.S. Pat. No. 8,506,171 discloses a strut bearing that includes an upper housing component and a lower housing component connected to each other via interlocking features at inner and outer rim portions. The connected housing components define a space for an axial ball bearing.

In order for strut bearings of this type to be reliable over a long part lifetime, the housing components must be connected to each other with a sufficient retention force to prevent the components from coming apart while also providing a sealed connection that inhibits damaging foreign material and debris from entering the enclosed bearing space. With current configurations, however, increased retention may be provided at the expense of seal reliability, and vice versa. The present disclosure is directed to overcoming one or more problems of the prior art by efficiently balancing retention and sealing considerations to provide a robust, yet cost-effective strut bearing.

SUMMARY

In one aspect, the present disclosure is directed to a strut bearing. The strut bearing includes an upper carrier including a first outer rim and a first inner rim, the first inner rim including a first circumferential connector. The strut bearing also includes a lower carrier including a second outer rim and a second inner rim, the second inner rim including a second circumferential connector. The first inner rim is held to the second inner rim through an overlapping connection of the first circumferential connector to the second circumferential connector. The strut bearing also includes a bearing arranged between the upper carrier and the lower carrier, and a first sealing ring positioned between and in contact with the first circumferential connector and the second circumferential connector. The sealing ring is formed from a material that is softer and more elastic than a material from which the first circumferential connector and the second circumferential connector are formed.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
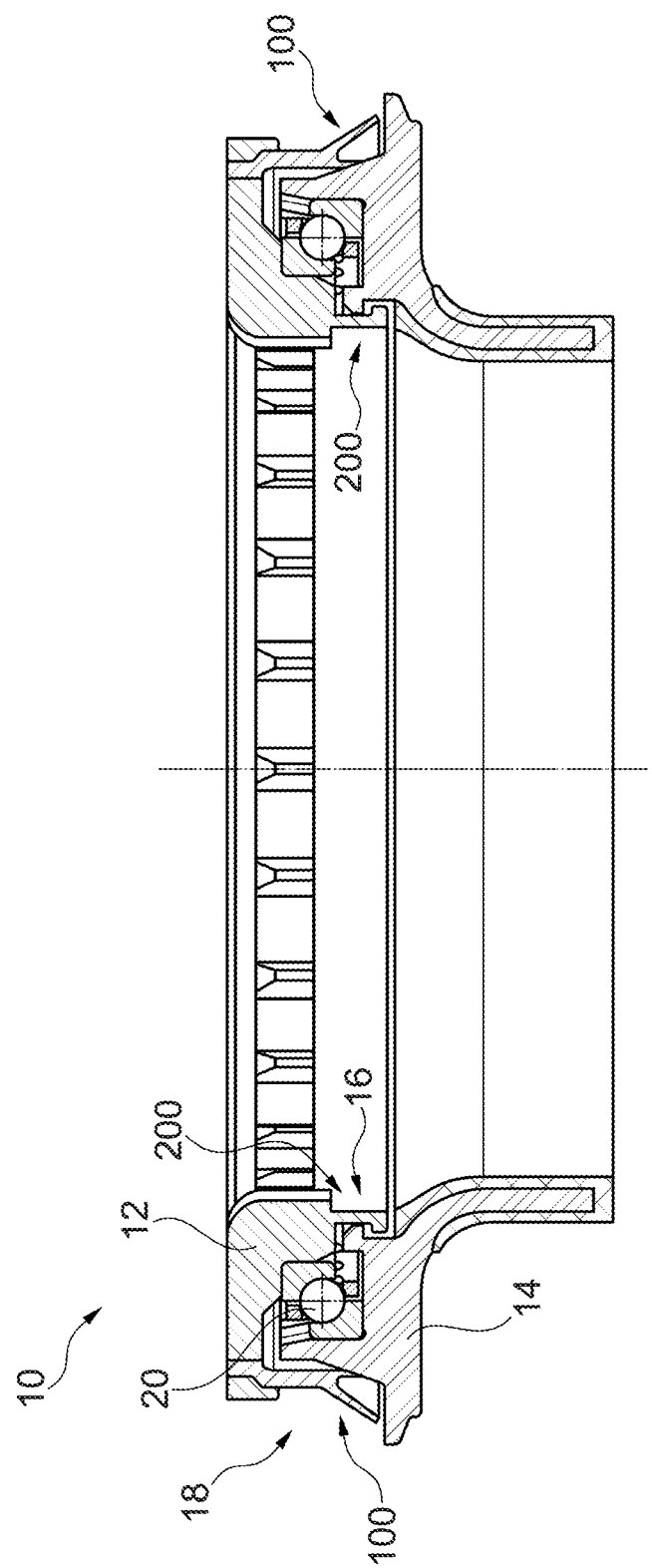
FIG. 1 is a cross-sectional view of an exemplary strut bearing.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 illustrates a longitudinal section through an exemplary strut bearing 10. The strut bearing 10 includes an upper carrier 12 and a lower carrier 14 which are connected to each other. The strut bearing 10 is ring-shaped, defining a center opening for receiving components of a vehicle strut (not shown) therethrough. The upper carrier 12 forms an upward-facing support surface upon which a vehicle mount or other component rests. The lower carrier 14 includes downward- and outward-facing surfaces for receiving a portion of shock-absorbing spring. In use, the strut bearing 10 rests on an upper coil portion of the spring (e.g., either directly or indirectly on another component which rests on the upper coil portion of the spring).

As shown in FIG. 1, the upper carrier 12 and the lower carrier 14 are connected to each other at an inner radial side 16 and an outer radial side 18. Between these connections, the upper carrier 12 and lower carrier 14 form a space for receiving a bearing 20. The bearing 20 may be formed as an angular contact ball bearing, an axial groove ball bearing, or the like.

Figure 2:
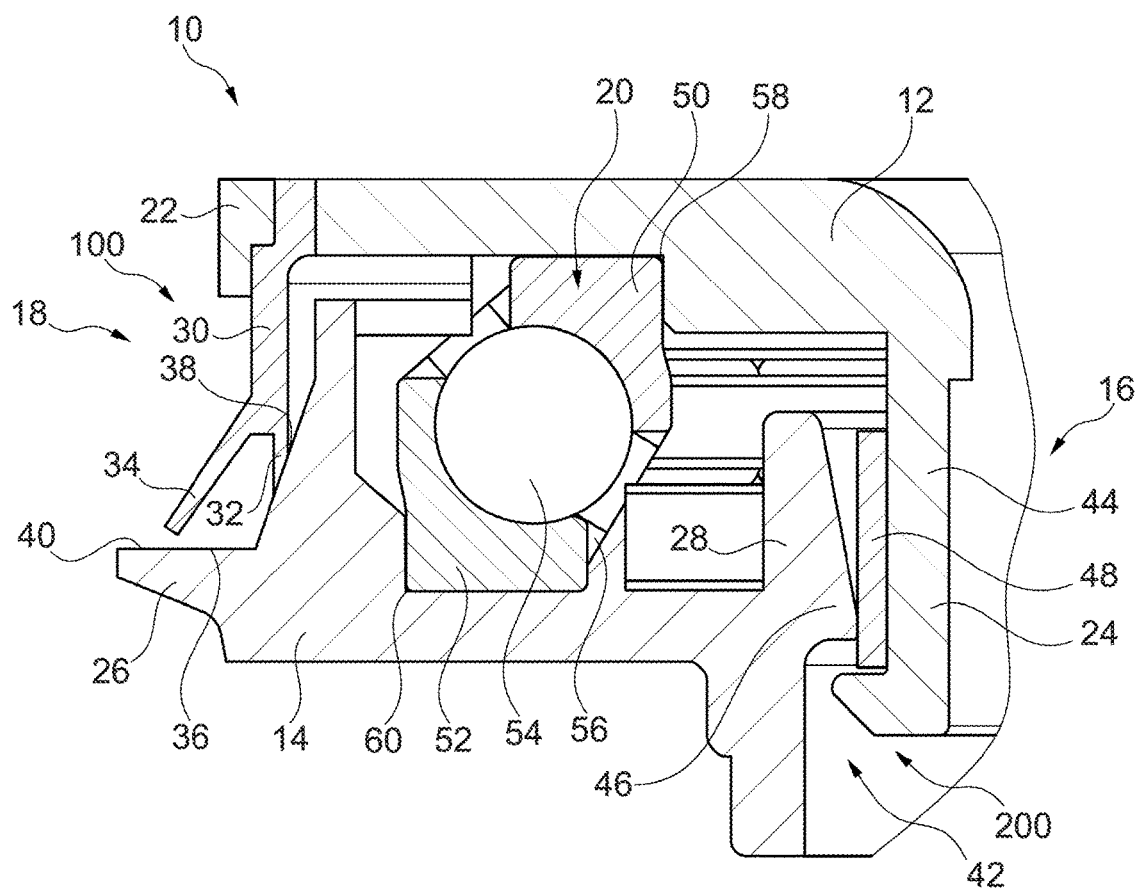
FIG. 2 is a detailed cross-sectional view of a connection portion of the strut bearing of FIG. 1.

FIG. 2 further illustrates a connection portion of the strut bearing 10. The upper carrier 12 includes an outer rim 22 and an inner rim 24. The lower carrier 14 includes an outer rim 26 and an inner rim 28. The outer rim 22 and the outer rim 26 overlap to form an outer rim connection 100. The inner rim 24 and the inner rim 28 overlap to form an inner rim connection 200.

In an exemplary embodiment, the outer rim connection 100 includes a sealing ring 30 secured to or integrally formed with the upper carrier 12. The sealing ring 30, in one embodiment, includes a pair of sealing lips 32, 34. In other embodiments, the sealing ring 30 may include only one of sealing lips 32, 34. The sealing ring 30 overlaps and contacts a seal contact portion 36 of the lower carrier 14, including surfaces 38 and 40. In a preferred embodiment, the sealing member 32 is elastically compressed against the surface 38 of the lower carrier 14 and the sealing lip 34 forms a gap seal together with the surface 40. In other embodiments, the sealing lip 34 forms a partial contact or complete contact seal. In this way, the upper carrier 12 is connected and sealed to the lower carrier 14 at the outer rim connection 100.

In an exemplary embodiment, the inner rim connection 200 includes a snap-type connection 42. For example, the upper carrier 12 includes an integrally formed inner circumferential connector 44 (i.e., a first circumferential connector) which projects axially and outwardly to at least partially surround an outer circumferential connector 46 (i.e., a second circumferential connector) formed integrally on the lower carrier 14. The outer circumferential connector 46 projects axially and inwardly from the lower carrier 14 to form the snap-type connection 42. The snap-type connection 42 attaches the upper carrier 12 to the lower carrier at the inner rim connection 200. More particularly, the inner rim 24 is held to the inner rim 28 through an overlapping connection of the inner circumferential connector 44 to the outer circumferential connector 46. For example, the inner and outer circumferential connectors 44, 46 may be hook-shaped connectors, as shown in FIG. 2.

In addition to the snap-type connection 42, the inner rim connection 200 includes a sealing ring 48 positioned between the inner circumferential connector 44 and the outer circumferential connector 46. In a preferred embodiment, the sealing ring 48 is in contact with both a ring shaped part of the inner circumferential connector 44 and the outer circumferential connector 46. In this way, the sealing ring 48 inhibits material from passing through a gap formed between the circumferential connectors 44, 46.

FIG. 2 further illustrates the bearing 20. The bearing 20 includes an upper ring 50 defining an upper race, and the upper ring 50 is supported on the upper carrier 12. A lower ring 52 defines a lower race, and the lower ring 52 is supported on the lower carrier 14. Rolling elements 54 are supported between the upper ring 50 and the lower ring 52, in contact with the upper and lower races. In some embodiments, the rolling elements 54 are retained by a bearing cage 56. As shown in FIG. 2, the upper carrier 12 preferably includes a radially inner support shoulder 58 for supporting the upper ring 50. Similarly, the lower carrier 14 preferably includes a radially outer support shoulder 60 for supporting the lower ring 52. It should be understood, however, that other mounting configurations for bearing 20 are possible between upper carrier 12 and lower carrier 14. For example, a plain bearing may be arranged between the upper carrier 12 and the lower carrier 14.

The disclosed strut bearing 10 includes features that provide high retention and sealing characteristics between the upper carrier 12 and the lower carrier 14. This is due in part to the materials selected for the various sections of the outer and inner rim connections 100, 200. For example, at the outer rim connection 100, the sealing ring 30 is formed from an elastic material that provides sufficient sealing and retention to maintain the outer rim connection 100 between the outer rims 22, 26 during operation of the strut bearing 10. The seal contact portion 36 of the lower carrier 14 is formed from a more rigid material than the sealing ring 30, thereby providing a hard surface for the elastic material of the sealing ring 30 to contact. It should be understood that alternative configurations of the outer rim connection 100 are possible, such as a snap-type connection, labyrinth connection, or the like.

At the inner rim connection 200, the inner and outer circumferential connectors 44, 46 are formed from a relatively rigid material such that a high retention force (e.g., 300 N or more, in some embodiments approximately 500 N) is provided between the upper carrier 12 and the lower carrier 14 at the inner rim connection 200. In addition, the sealing ring 48 is formed from a softer and more elastic material than the inner and outer circumferential connectors 44, 46, such that the sealing ring 48 maintains contact with both circumferential connectors 44, 46 without interfering with the high retention force provided thereby.

In a preferred embodiment, the inner and outer circumferential connectors 44, 46 are formed from a molded plastic material, such as nylon. The sealing rings 30, 48, on the other hand, are preferably formed from a thermoplastic polyurethane (TPU) or a thermoplastic elastomer (TPE). The sealing ring 48 is shown as attached to an axially-extending surface of the inner circumferential ring 44, but the sealing ring 48 may be attached to another surface (e.g., an outwardly-extending surface of the inner circumferential ring 44, or a surface of the outer circumferential ring 46).

In some embodiments, the upper carrier 12 may be formed separately from the sealing ring 30 and/or the sealing ring 48 and then attached to each other during a manufacturing process. In other embodiments, the upper carrier 12 and the sealing ring 30 and/or the sealing ring 48 may be integrally formed as one piece. For example, the upper carrier 12, including the sealing rings 30, 48, may be formed through a molding process using the two different materials. In other embodiments, lower carrier 14 and the sealing ring 30 may be integrally formed as one piece.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Strut Bearing
12. Upper Carrier
14. Lower Carrier
16. Inner Radial Side
18. Outer Radial Side
20. Bearing
22. Outer Rim
24. Inner Rim
26. Outer Rim
28. Inner Rim
30. Sealing Ring
32. Lip
34. Lip
36. Seal Contact Portion
38. Surface
40. Surface
42. Snap-Type Connection
44. Inner Circumferential Connector
46. Outer Circumferential Connector
48. Sealing Ring
50. Upper Ring
52. Lower Ring
54. Rolling Element
56. Bearing Cage
58. Radially Inner Support Shoulder
60. Radially Outer Support Shoulder
100. Outer Rim Connection
200. Inner Rim Connection

What is claimed is:
1. A strut bearing, comprising
an upper carrier including a first outer rim and a first inner rim, the first inner rim including a first circumferential connector;

a lower carrier including a second outer rim and a second inner rim, the second inner rim including a second circumferential connector, the first inner rim being held to the second inner rim through an overlapping connection of the first circumferential connector to the second circumferential connector;

a bearing arranged between the upper carrier and the lower carrier; and a first sealing ring positioned between and in contact with the first circumferential connector and the second circumferential connector, wherein the first sealing ring is formed from a material that is softer and more elastic than a material from which the first circumferential connector and the second circumferential connector are formed.

2. The strut bearing of claim 1, wherein the first circumferential connector and the second circumferential connector are formed from nylon and the first sealing ring is formed from TPU or TPE.

3. The strut bearing of claim 1, wherein the first circumferential connector and the second circumferential connector produce a retention force of at least 300 N.

4. The strut bearing of claim 3, wherein the retention force is approximately 500 N.

5. The strut bearing of claim 1, wherein the first sealing ring is integrally formed with the upper carrier or the lower carrier.

6. The strut bearing of claim 1, wherein the first outer rim includes a second sealing ring and the second outer rim includes a seal contact portion, the second sealing ring being compressed against a surface of the seal contact portion.

7. The strut bearing of claim 6, wherein the first sealing ring is integrally formed with the upper carrier or the lower carrier.

8. The strut bearing of claim 7, wherein the first sealing ring and the second sealing ring are integrally formed with the upper carrier.

9. The strut bearing of claim 1, wherein the first circumferential connector and the second circumferential connector form a snap-type connection.

10. The strut bearing of claim 9, wherein the first circumferential connector and the second circumferential connector are hook-shaped connectors.

11. The strut bearing of claim 1, wherein the bearing includes an upper ring supported on the upper carrier and defining an upper race, a lower ring supported on the lower carrier and defining a lower race, and rolling elements supported between the upper ring and the lower ring, the rolling elements in contact with the upper race and the lower race.

* * * * *